United States Patent
Xie

(10) Patent No.: US 10,852,798 B2
(45) Date of Patent: Dec. 1, 2020

(54) POWER SUPPLY CONTROL METHOD AND APPARATUS FOR POWER STRIP, AND STORAGE MEDIUM

(71) Applicant: Beijing Xiaomi Mobile Software Co., Ltd., Beijing (CN)

(72) Inventor: Yan Xie, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 431 days.

(21) Appl. No.: 15/818,989

(22) Filed: Nov. 21, 2017

(65) Prior Publication Data
US 2018/0150119 A1 May 31, 2018

(30) Foreign Application Priority Data
Nov. 26, 2016 (CN) .......................... 2016 1 1057401

(51) Int. Cl.
| | |
|---|---|
| G06F 1/26 | (2006.01) |
| H02J 7/00 | (2006.01) |
| H02J 9/06 | (2006.01) |
| G06F 1/28 | (2006.01) |
| G06F 1/3287 | (2019.01) |

(Continued)

(52) U.S. Cl.
CPC .............. *G06F 1/266* (2013.01); *G06F 1/28* (2013.01); *G06F 1/3287* (2013.01); *H02J 7/0047* (2013.01); *H02J 9/06* (2013.01); *G06F 2200/261* (2013.01); *H01R 13/665* (2013.01); *H01R 25/003* (2013.01); *H02J 7/0049* (2020.01); *Y02B 70/10* (2013.01)

(58) Field of Classification Search
CPC .......... G06F 1/266; G06F 1/28; G06F 1/3287; G06F 2200/261; H02J 7/0047; H02J 9/06; H02J 7/0049; H02J 9/005; Y02B 70/16; H01R 13/665; H01R 25/003; H01R 13/66; H01R 13/70; H01R 25/00
See application file for complete search history.

(56) References Cited

U.S. PATENT DOCUMENTS

| | | | |
|---|---|---|---|
| 7,964,994 B2 | 6/2011 | DuBose et al. | |
| 7,964,995 B2 | 6/2011 | DuBose et al. | |

(Continued)

FOREIGN PATENT DOCUMENTS

| | | |
|---|---|---|
| CN | 201504719 U | 6/2010 |
| CN | 103413986 A | 11/2013 |

(Continued)

OTHER PUBLICATIONS

Extended European Search Report of European Patent Application No. 17198153.3, from the European Patent office, dated Dec. 18, 2017.

(Continued)

*Primary Examiner* — Daniel J Cavallari
(74) *Attorney, Agent, or Firm* — Finnegan, Henderson, Farabow, Garrett & Dunner, L.L.P.

(57) ABSTRACT

The present disclosure relates to a method and apparatus for providing power supply control of a power strip. The method includes: acquiring a charge state or a working state of an electronic device; and controlling a power supply state of a socket of the power strip according to the charge state or the working state of the electronic device, the socket being connected with the electronic device.

16 Claims, 7 Drawing Sheets

(51) Int. Cl.
*H01R 13/66* (2006.01)
*H01R 25/00* (2006.01)

(56) References Cited

U.S. PATENT DOCUMENTS

| | | | |
|---|---|---|---|
| 7,977,823 B2 | 7/2011 | DuBose et al. | |
| 2011/0241443 A1 | 10/2011 | DuBose et al. | |
| 2011/0241444 A1 | 10/2011 | DuBose et al. | |
| 2011/0273216 A1 | 11/2011 | DuBose et al. | |
| 2012/0201062 A1 | 8/2012 | Lee | |
| 2013/0093381 A1* | 4/2013 | McGinley | H02J 7/0068 320/107 |
| 2014/0330989 A1 | 11/2014 | Brewer et al. | |
| 2017/0010661 A1* | 1/2017 | Yang | G06F 1/266 |
| 2017/0133843 A1* | 5/2017 | McNeill-McCallum | H02J 9/005 |

FOREIGN PATENT DOCUMENTS

| | | |
|---|---|---|
| CN | 104022407 A | 9/2014 |
| CN | 104868326 A | 8/2015 |
| CN | 105431986 A | 3/2016 |
| CN | 205104719 U | 3/2016 |
| CN | 105467874 A | 4/2016 |
| CN | 205282795 U | 6/2016 |
| CN | 205385343 U | 7/2016 |
| CN | 105896677 A | 8/2016 |
| CN | 106094631 A | 11/2016 |
| JP | 2000350386 A | 12/2000 |
| KR | 101018093 B1 | 2/2011 |
| KR | 10-2016-0014355 A | 2/2016 |
| RU | 2011102960 A | 6/2009 |
| WO | WO-2015155250 A1 * 10/2015 .......... H02J 13/0006 |

OTHER PUBLICATIONS

International Search Report issued in International Application No. PCT/CN2016/111268, mailed from the State Intellectual Property Office of China dated Aug. 30, 2017.

Office Action in counterpart Russian Application No. 2017137121/08(064731), dated Oct. 31, 2018.

Communication pursuant to Article 94(3) EPC issued in corresponding European Application No. 17198153.3, dated Jul. 2, 2020.

* cited by examiner

POWER SUPPLY CONTROL METHOD AND APPARATUS FOR POWER STRIP, AND STORAGE MEDIUM

CROSS-REFERENCE TO RELATED APPLICATION

This application is based on and claims the priority of the Chinese Patent Application No. 201611057401.6, filed on Nov. 26, 2016, which is incorporated herein by reference in its entirety.

TECHNICAL FIELD

The present disclosure is generally related to the field of electronic device technology, and more particularly, to a power supply control method and apparatus for a power strip, and a storage medium.

BACKGROUND

A power strip, also referred to as an extension block, a power board, a plug board, a plug bar or a wiring board, typically refers to a portable block of sockets with a power cable and a plug. When charging an electronic device using a power strip, a user may forget to unplug the electronic device after the electronic device is fully charged. As a result, the electronic device may be overcharged, thereby not only causing a waste of power but also possibly causing a damage to the electronic device.

SUMMARY

According to a first aspect of the present disclosure, there is provided a method of power supply control for a power strip, comprising: acquiring a charge state or a working state of an electronic device; and controlling a power supply state of a socket of the power strip according to the charge state or the working state of the electronic device, the socket being connected with the electronic device.

According to a second aspect of the present disclosure, there is provided a power supply control apparatus of a power strip, comprising: a processor; and a memory configured to store instructions executable by the processor, wherein the processor is configured to: acquire a charge state or a working state of an electronic device; and control a power supply state of a socket of the power strip according to the charge state or the working state of the electronic device, the socket being connected with the electronic device.

According to a third aspect of the present disclosure, there is provided a non-transitory computer-readable storage medium having stored therein instructions that, when executed by a processor of an apparatus, cause the apparatus to perform a power supply control method for a power strip, the method comprising: acquiring a charge state or a working state of an electronic device; and controlling a power supply state of a socket of the power strip according to the charge state or working state of the electronic device, the socket being connected with the electronic device.

It should be understood that both the foregoing general description and the following detailed description are only exemplary and explanatory and are not restrictive of the present disclosure.

BRIEF DESCRIPTION OF THE DRAWINGS

The accompanying drawings, which are incorporated in and constitute a part of the description, illustrate the embodiments according to the present disclosure, and serve to explain the principles of the present disclosure together with the description.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of apparatus and methods consistent with aspects related to the disclosure as recited in the appended claims.

Figure 1:
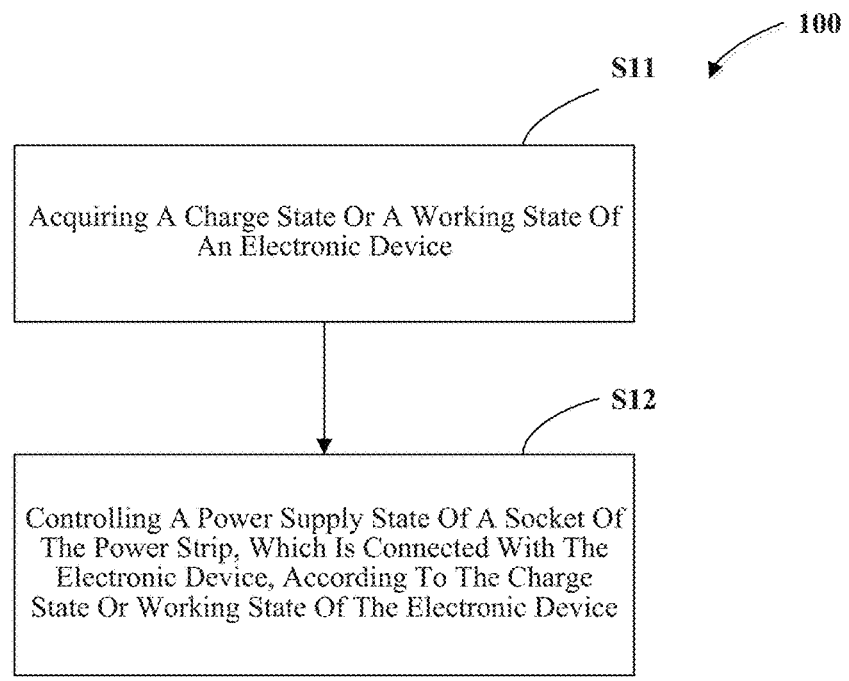
FIG. 1 is a flow chart of a power supply control method for a power strip according to an exemplary embodiment.

FIG. 1 is a flow chart of a power supply control method 100 for a power strip according to an exemplary embodiment. The method 100 may be applied to a power strip. As shown in FIG. 1, the method 100 includes the following steps.

At step S11, a charge state or a working state of an electronic device is acquired.

At step S12, a power supply state of a socket of the power strip, which is connected with the electronic device, is controlled according to the charge state or the working state of the electronic device.

By controlling the power supply state of the socket of the power strip which is connected with the electronic device according to the charge state or the working state of the electronic device, the method 100 enables flexibly controlling of the power supply state of the socket of the power strip, so that the electronic device can be prevented from being overcharged, and power supply to the electronic device can be prevented if the electronic device does not need to be power-supplied, thereby not only saving power and but also protecting the electronic device.

In the present embodiment, the charge state of the electronic device may include, but is not limited to, whether a state of charge (SOC) of the electronic device meets a preset condition, such as whether the SOC indicates a full charge or whether the SOC exceeds a preset threshold, which is not limited in the present disclosure. The working state of the electronic device may include, but is not limited to, whether the electronic device is performing a task or whether it has completed a preset task, such as whether the electronic device has completed a charging task or a task initiated by itself (such as cooking), which is not limited in the present disclosure.

In one embodiment, acquiring the charge state or the working state of the electronic device includes: acquiring, via a wire connecting the electronic device and the power strip, state information of the electronic state sent by the electronic device, the state information including the charge state or the working state of the electronic device. For example, if a cell phone is connected with the power strip via a data line, a charge state or a working state of the cell phone can be acquired via the data line.

In the embodiment, the charge state or the working state of the electronic device connected with the power strip may be acquired in a wired manner. When the electronic device detects that it satisfies a certain charge state or working state, it may actively send its state information to the power strip. In one embodiment, the power strip may send a request message to the electronic device, requesting the electronic device to report its charge state or working state. After receiving the request message, the electronic device returns its state information to the power strip. The power strip may send the request message to the electronic device periodically, for example, once per minute.

The embodiment enables communications between the electronic device and the power strip via electrical signals, so that the power supply state of the socket of the power strip connected with the electronic device can be timely and effectively controlled.

In one embodiment, acquiring the charge state or the working state of the electronic device may include: receiving, using a wireless communications technology, the state information of the electronic device sent by the electronic device, the state information including the charge state or the working state of the electronic device. The wireless communications technology may include a Wi-Fi (Wireless Fidelity) technology, a Bluetooth technology, a mobile communications network or the like, which is not limited herein.

In the embodiment, the charge state or the working state of the electronic device connected with the power strip may be acquired in a wireless manner. For example, Bluetooth modules may be provided in the power strip and the electronic device respectively to establish a communications link between the power strip and the electronic device. When the electronic device detects that it satisfies a certain charge state or working state, it may actively send its state information to the power strip in a wireless manner. In one embodiment, the power strip may periodically send a request message to the electronic device, requesting for the charge state or the working state of the electronic device.

The embodiment enables wireless communications between the electronic device and the power strip, so that the power strip can promptly and accurately acquire the state information of the electronic device and then effectively control the power supply state of the socket of the power strip connected with the electronic device.

In one embodiment, the state information may further include device identification information of the electronic device. The device identification information of the electronic device may be carried, when the electronic device sends its state information to the power strip using a wireless communications technology or in a wired manner. When the power strip detects that an electronic device is connected with it, the power strip records a correspondence between device identification information of the electronic device and a socket with which the electronic device is connected. Accordingly, state information of each electronic device received by the power strip carries device identification information of the electronic device, so that the power strip can determine a socket into which the electronic device is inserted based on the device identification information of the electronic device and the recorded correspondence between the device identification information and the socket, and accurately determine which socket needs to be controlled in terms of its power supply state based on the state of each electronic device.

In the present embodiment, the power strip may charge electronic devices, such as a cell phone, a portable power source or a tablet computer, and may also supply power to electronic devices, such as an electric kettle or an electric cooker. The types and functions of the electronic devices are not limited in the present disclosure.

Figure 2:
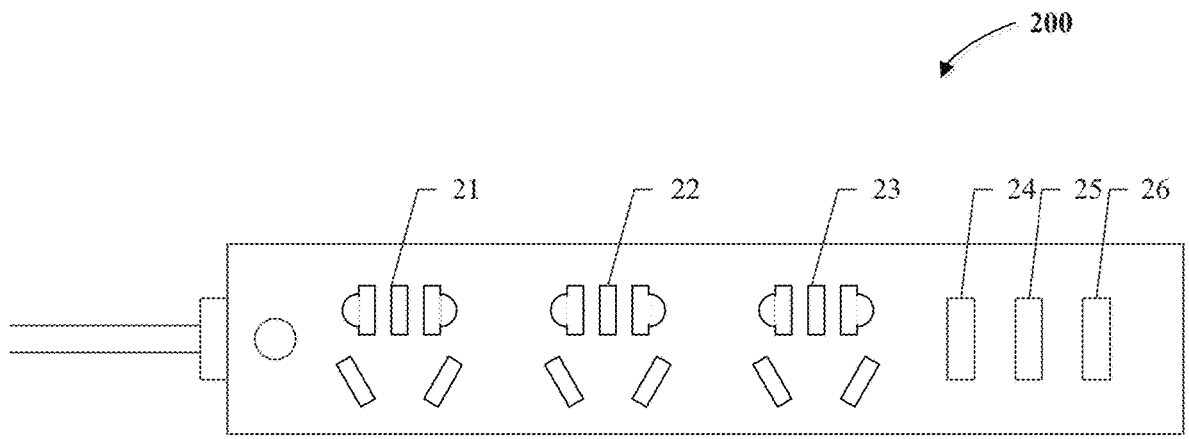
FIG. 2 is a schematic diagram of a power strip according to an exemplary embodiment.

FIG. 2 is a schematic diagram of a power strip 200 according to an exemplary embodiment. As shown in FIG. 2, the power strip 200 includes a first socket 21, a second socket 22, a third socket 23, a fourth socket 24, a fifth socket 25, and a sixth socket 26. The first, second and third sockets 21, 22, 23 are five-hole sockets. The fourth, fifth and sixth sockets 24, 25, 26 are USB (Universal Serial Bus) sockets. For example, the first socket 21 may be connected with an electric kettle, the third socket 23 with an electric cooker, and the fourth socket 24 with a cell phone.

It should be noted that the power strip may include one or more types of various sockets such as two-hole sockets, three-hole sockets, five-hole sockets and USB sockets. The types of the sockets included in the power strip and the number of each type of sockets are not limited in the present embodiment.

In addition, a correspondence between a charge state or a working state of the electronic device and a power supply state of the socket which is connected with the electronic device may be set as needed.

In one embodiment, controlling the power supply state of the socket of the power strip which is connected with the electronic device according to the charge state of the electronic device may include: when a SOC of the electronic device reaches a first preset value, controlling the socket connected with the electronic device to enter a power supply disabled state. The SOC may be represented by a ratio of an available charge amount in a battery to a rated charge capacity thereof. For example, the first preset value may be 100%, which is not limited in the present disclosure. In this embodiment, when the SOC of the electronic device reaches the first preset value, the electronic device may send state information to the power strip indicating that the SOC of the electronic device reaches the first preset value. When receiving the state information indicating that the SOC of the electronic device reaches the first preset value, the power strip may control the socket which is connected with the electronic device to enter a power supply disabled state. As a result, the electronic device can be prevented from being overcharged, thereby not only saving power but also protecting the electronic device.

In one embodiment, controlling the power supply state of the socket of the power strip which is connected with the electronic device according to the charge state of the electronic device may include: when the SOC of the electronic device is smaller than a second preset value, controlling the socket which is connected with the electronic device to enter a power supply enabled state. For example, the second preset value may be 20%, which is not limited in the present disclosure. In this embodiment, when the SOC of the electronic device is smaller than the second preset value, the electronic device may send state information to the power strip indicating that the SOC of the electronic device is smaller than the second preset value. When receiving the state information indicating that the SOC of the electronic device is smaller than the second preset value, the power strip may control the socket which is connected with the electronic device to enter a power supply enabled state. As a result, the electronic device can be automatically charged and enter a charged state when the SOC of the electronic device is low, thereby improving user experience.

In one embodiment, controlling the power supply state of the socket of the power strip which is connected with the electronic device according to the working state of the electronic device may include: when the electronic device has completed a preset task, controlling the socket which is connected with the electronic device to enter a power supply disabled state. For example, when an electric cooker completes cooking rice, it may send a message to the power strip indicating that a cooking task has been completed. After receiving the message indicating that the cooking task has been completed, the power strip determines that the electric cooker has completed the preset task, and may control the socket corresponding to the electric cooker to enter a power supply disabled state so as to cut off power supply to the electric cooker, thereby not only saving power but also protecting the electric cooker. As another example, when an electric kettle completes a water heating task, it may send a message to the power strip indicating that the water heating task has been completed. After receiving the message indicating that the water heating task has been completed by the electric kettle, the power strip determines that the electric kettle has completed a preset task, and may control the socket corresponding to the electric kettle to enter a power supply disabled state so as to cut off power supply to the electric kettle, thereby not only saving power but also protecting the electric kettle.

In addition, the preset task in the present disclosure may also be a preset amount of task designated by a user. For example, the user may set in advance a humidifying period of 1 hour for an indoor air humidifier. When 1 hour passes, the humidifier may send a message to the power strip indicating that humidifying has been completed. After receiving the message, the power strip controls the socket corresponding to the humidifier to cut off power supply to the humidifier.

In one embodiment, before controlling the power supply state of the socket of the power strip which is connected with the electronic device according to the charge state or the working state of the electronic device, the method 100 may further include: when it is detected that the electronic device is plugged in the power strip, determining the socket with which the electronic device is connected, according to a sensing signal detected by a sensor provided on a metal sheet of the socket of the power strip. In this embodiment, sensors may be provided on metal sheets of respective sockets of the power strip so as to detect, via the sensors, whether electronic devices are inserted into the sockets. The present embodiment enables more accurately detecting insertion of a plug into a socket.

In one embodiment, when a socket has no electronic device plugged therein, the socket may be controlled to enter a power supply disabled state, thereby improving safety of the power strip.

In one embodiment, before controlling the power supply state of the socket of the power strip which is connected with the electronic device according to the charge state or the working state of the electronic device, the method 100 may further include: when it is detected that the electronic device is plugged in the power strip, determining the socket with which the electronic device is connected and device identification information of the electronic device; establishing a correspondence between the device identification information of the electronic device and the socket with which the electronic device is connected; and when the electronic device is in a preset charge state or a preset working state, determining the socket with which the electronic device is connected according to the correspondence.

In the present embodiment, the preset charge state may be the above-mentioned SOC, and the preset working state may be the above-mentioned task completion state. In the present embodiment, when it is detected that an electronic device is inserted into the power strip, a correspondence between identification information of the inserted electronic device and its connected socket is established. Each socket of the power strip may be preconfigured with identification information, and a correspondence between the identification information of the inserted electronic device and the identification information of the socket may be established. The present embodiment facilitates quickly and accurately locating a socket corresponding to a specific electronic device when power supply to the specific electronic device needs to be controlled afterwards.

Figure 3:
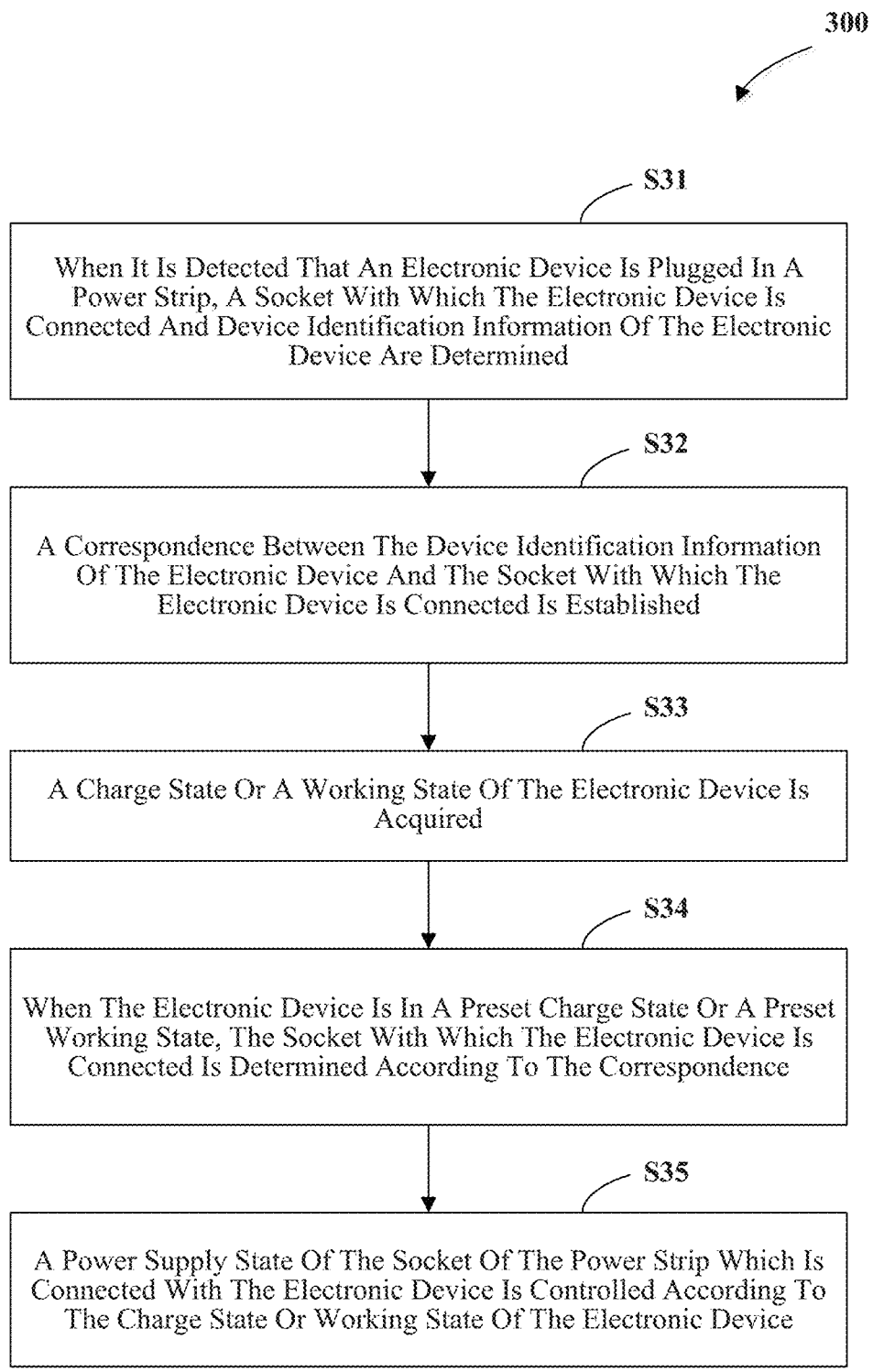
FIG. 3 is a flow chart of a power supply control method for a power strip according to an exemplary embodiment.

FIG. 3 is a flow chart of a power supply control method 300 for a power strip according to an example of an exemplary embodiment. As shown in FIG. 3, the method 300 includes the following steps.

In step S31, when it is detected that an electronic device is plugged in a power strip, a socket with which the electronic device is connected and device identification information of the electronic device are determined.

For example, sensors may be provided to metal sheets of respective sockets of the power strip so as to detect, via the sensors, whether an electronic device is inserted into one of the sockets and in which socket the electronic device is inserted. When a sensor detects that an electronic device is inserted, a socket corresponding to the sensor may be determined as the socket connected with the electronic device.

In one embodiment, the device identification information of the electronic device may be acquired via a wire connecting the electronic device and the power strip, and the acquired device identification information may be determined as the device identification information of the electronic device.

In step S32, a correspondence between the device identification information of the electronic device and the socket with which the electronic device is connected is established.

For example, a mapping table may be established to record the correspondence between the device identification information of the electronic device and the socket with which the electronic device is connected.

In step S33, a charge state or a working state of the electronic device is acquired, similar to step S11 (FIG. 1).

In step S34, when the electronic device is in a preset charge state or a preset working state, the socket with which the electronic device is connected is determined according to the correspondence.

The preset charge state of the electronic device may include a state in which the SOC of the electronic device reaches a first preset value and/or a state where the SOC of the electronic device is smaller than a second preset value. The preset working state of the electronic device may refer to a state in which the electronic device has completed a preset task.

In step S35, a power supply state of the socket of the power strip which is connected with the electronic device is controlled according to the charge state or the working state of the electronic device, similar to step S12 (FIG. 1).

In the example, a correspondence between device identification information of each electronic device and a socket with which the electronic device is connected, is established. The socket with which the electronic device is connected can be determined according to the device identification information of the electronic device carried by state information of the electronic device when the state information of the electronic device is received through a wireless communications technology or the like. And a socket that needs to be controlled in terms of its power supply state can be accurately determined based on the state information of the corresponding electronic device. The present embodiment enables flexibly controlling a power supply state of a socket of a power strip, so that an electronic device can be prevented from being overcharged and power can be prevented from being supplied to an electronic device that does not need to be power supplied, thereby not only saving power but also protecting the electronic device.

Figure 4:
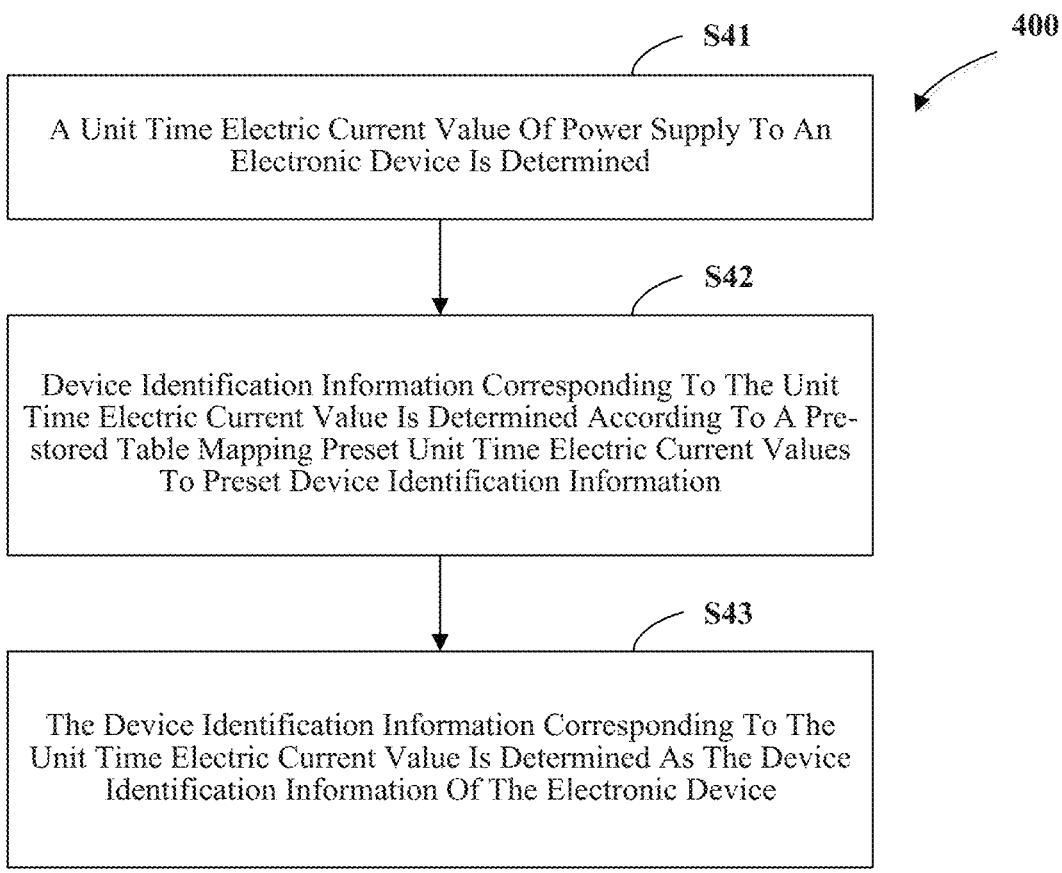
FIG. 4 is a flow chart of a method for determining device identification information of an electronic device according to an example of an exemplary embodiment.

FIG. 4 is a flow chart of a method 400 for determining device identification information of an electronic device in power supply control for a power strip according to an exemplary embodiment. The method 400 may be performed in step S31 of the method 300. As shown in FIG. 4, the method 400 includes the following steps.

In step S41, a unit time electric current value of power supply to an electronic device is determined.

In this example, a unit time electric current value in a charging line or data line connected with the electronic device may be detected by the electronic device and sent to the power strip.

In step S42, device identification information corresponding to the unit time electric current value is determined, according to a pre-stored table mapping preset unit time electric current values to preset device identification information.

In this example, a mapping table is pre-stored, which records a correspondence between preset unit time electric current values and preset device identification information. After determining the unit time electric current value of the power supply to the electronic device, the corresponding device identification information can be determined according to the pre-stored mapping table.

In step S43, the device identification information corresponding to the unit time electric current value is determined as the device identification information of the electronic device.

Because working electric currents required by different electronic devices are different, the present embodiment can distinguish different electronic devices based on the working electric currents. For example, the working electric current of an electric cooker is about 3.2 A, and the working electric current of a washing machine is about 1.5 A. The correspondence between working electric currents of different electronic devices and identifications of the different electronic devices may be pre-stored so that, after determining a working electric current of an electronic device, the electronic device can be determined according to the correspondences. In one embodiment, the correspondence may be obtained via a network based on the detected electric current value, and then the electronic device corresponding to the detected electric current value may be determined.

In this example, a unit time electric current value of power supply to an electronic device is determined, device identification information corresponding to the unit time electric current value is determined according to a pre-stored mapping table, and the device identification information corresponding to the unit time electric current value is determined as the device identification information of the electronic device. As such, a correspondence between the device identification information of the electronic device and the socket with which the electronic device is connected, is established based on the determined device identification information of the electronic device.

Figure 5:
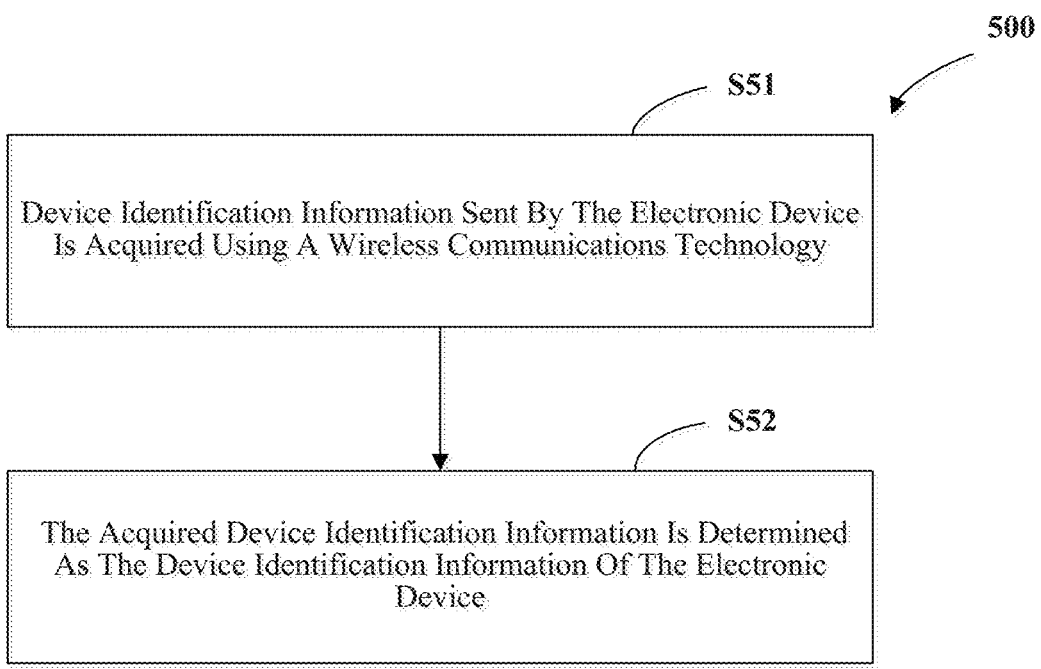
FIG. 5 is a flow chart of a method for determining device identification information of an electronic device according to an exemplary embodiment.

FIG. 5 is a flow chart of a method 500 of determining device identification information of an electronic device in power supply control for a power strip according to an exemplary embodiment. The method 500 may be performed in step S31 of the method 300. As shown in FIG. 5, the method 500 includes the following steps.

In step S51, device identification information sent by an electronic device is acquired using a wireless communications technology.

In this example, when the electronic device is inserted into the power strip, the electronic device may send its device identification information to the power strip using a wireless communications technology, so that the power strip can receive the device identification information of the electronic device.

In step S52, the acquired device identification information is determined as the device identification information of the electronic device.

In this example, device identification information of an electronic device is acquired using a wireless communications technology, and the acquired device identification information is detected as the device identification information of the electronic device. As such, a correspondence between the device identification information of the electronic device and the socket with which the electronic device is connected, is established based on the determined device identification information of the electronic device.

In one embodiment, when the electronic device changes from a state of being connected with the power strip to a state of being disconnected from the power strip or when the electronic device is unplugged from the power strip, the correspondence between the electronic device and the socket may be deleted.

Figure 6:
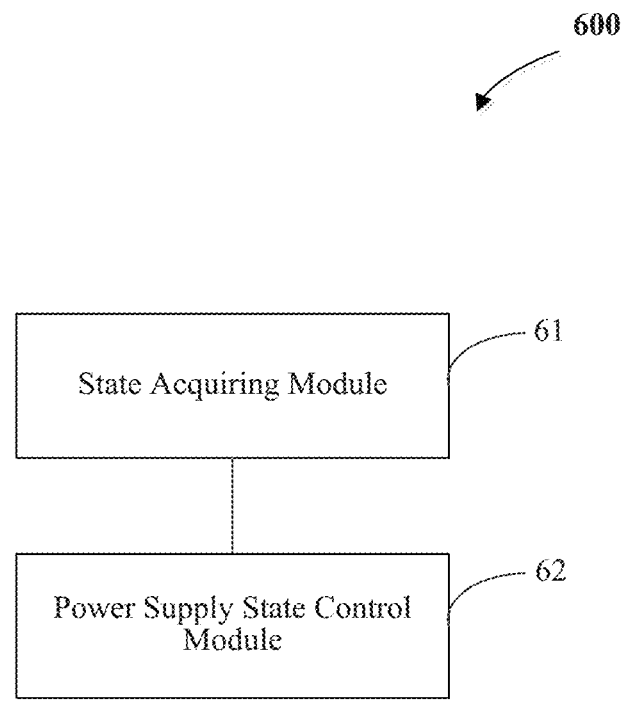
FIG. 6 is a block diagram of a power supply control apparatus for a power strip according to an exemplary embodiment.

FIG. 6 is a block diagram of a power supply control apparatus 600 for a power strip according to an exemplary embodiment. As shown in FIG. 6, the apparatus 600 includes a state acquiring module 61 and a power supply state control module 62. The state acquiring module 61 is configured to acquire a charge state or a working state of an electronic device. The power supply state control module 62 is configured to control a power supply state of a socket of the power strip which is connected with the electronic device, according to the charge state or the working state of the electronic device.

Figure 7A:
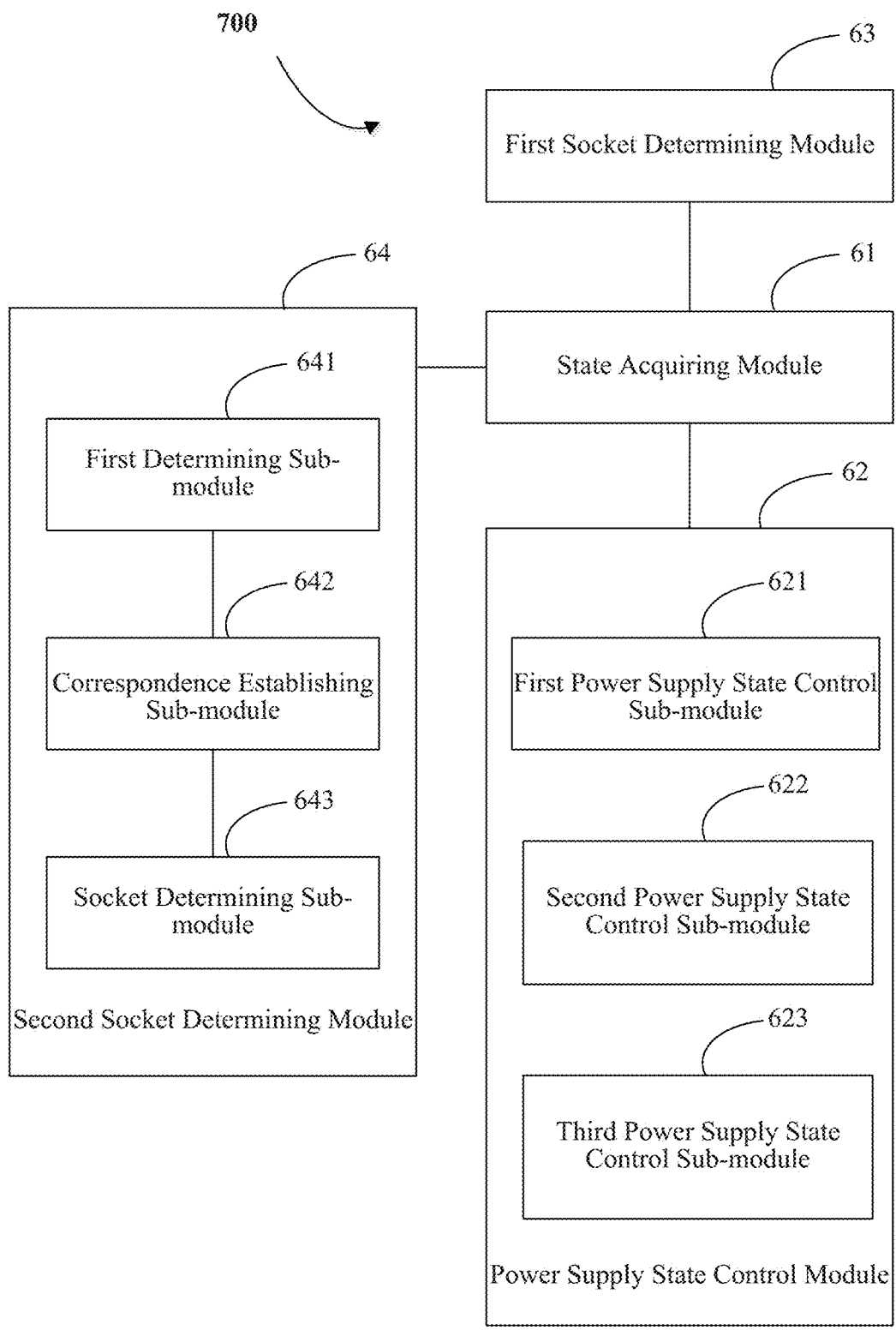
FIG. 7A is a block diagram of a power supply control apparatus for a power strip according to an exemplary embodiment.

FIG. 7A is a block diagram of a power supply control apparatus 700 for a power strip according to an exemplary embodiment. The apparatus 700a may be configured based on the apparatus 600. Referring to FIG. 7A, the power supply state control module 62 includes a first power supply state control sub-module 621. The first power supply state control sub-module 621 is configured to, when an SOC of the electronic device reaches a first preset value, control the socket which is connected with the electronic device to enter a power supply disabled state.

In one embodiment, the power supply state control module 62 includes a second power supply state control sub-module 622. The second power supply state control sub-module 622 is configured to, when the SOC of the electronic device is smaller than a second preset value, control the socket which is connected with the electronic device to enter a power supply enabled state.

In one embodiment, the power supply state control module 62 includes a third power supply state control sub-module 623. The third power supply state control sub-module 623 is configured to, when the electronic device has completed a preset task, control the socket which is connected with the electronic device to enter a power supply disabled state.

Figure 7B:
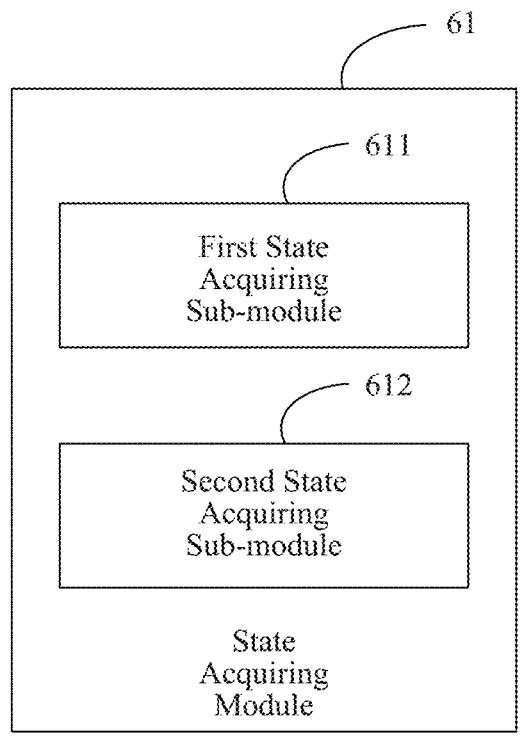
FIG. 7B is a block diagram of a state acquiring module of a power supply control apparatus according to an exemplary embodiment.

FIG. 7B is a block diagram of the state acquiring module 61 (FIG. 6), according to an exemplary embodiment. Referring to FIG. 7B, the state acquiring module 61 includes a first state acquiring sub-module 611. The first state acquiring sub-module 611 is configured to acquire, via a wire connecting the electronic device and the power strip, state information sent by the electronic device, the state information comprising the charge state or working state of the electronic device.

In one embodiment, the power supply state control module 61 includes a second state acquiring sub-module 612. The second state acquiring sub-module 612 is configured to receive, using a wireless communications technology, the state information sent by the electronic device.

In one embodiment, the state information may include device identification information of the electronic device.

Referring back to FIG. 7A, in one embodiment, the apparatus 700 further includes a first socket determining module 63. The first socket determining module 63 is configured to, when it is detected that the electronic device is plugged in the power strip, determine the socket with which the electronic device is connected according to a sensing signal detected by a sensor provided on a metal sheet of the socket of the power strip.

In one embodiment, the apparatus 700 further includes a second socket determining module 64. The second socket determining module 64 includes a first determining sub-module 641, a correspondence establishing sub-module 642 and a socket determining sub-module 643. The first determining sub-module 641 is configured to, when it is detected that the electronic device is plugged in the power strip, determine the socket with which the electronic device is connected and device identification information of the electronic device. The correspondence establishing sub-module 642 is configured to establish a correspondence between the device identification information of the electronic device and the socket with which the electronic device is connected. The socket determining sub-module 643 is configured to, when the electronic device is in a preset charge state or a preset working state, determine the socket with which the electronic device is connected according to the correspondence.

In one embodiment, the first determining sub-module 641 may include: a unit time electric current value determining unit, a first device identification information determining unit and a second device identification information determining unit. The unit time electric current value determining unit is configured to determine a unit time electric current value of the power supply to the electronic device. The first device identification information determining unit is configured to determine device identification information corresponding to the unit time electric current value, according to a pre-stored table mapping preset unit time electric current values to preset device identification information. The second device identification information determining unit is configured to determine the device identification information corresponding to the unit time electric current value as the device identification information of the electronic device.

In one embodiment, the first determining sub-module 641 may include: a device identification information acquiring unit and a third device identification information determining unit. The device identification information acquiring unit is configured to acquire device identification information of the electronic device via a wireless communications technology. The third device identification information determining unit is configured to determine the acquired device identification information as the device identification information of the electronic device.

The present embodiment enables flexibly controlling a power supply state of a socket of a power strip, so that an electronic device can be prevented from being overcharged and power can be prevented from being supplied to an electronic device that does not need to be power supplied, thereby not only saving power but also protecting the electronic device.

Another embodiment of the present disclosure provides a power strip including any of the above power supply control apparatuses of a power strip.

Another embodiment of the present disclosure provides a power supply control apparatus for a power strip. The apparatus may include: a processor; and a memory configured to store instructions executable by the processor. The processor is configured to: acquire a charge state or working state of an electronic device; and control a power supply state of a socket of the power strip which is connected with the electronic device according to the charge state or working state of the electronic device.

Figure 8:
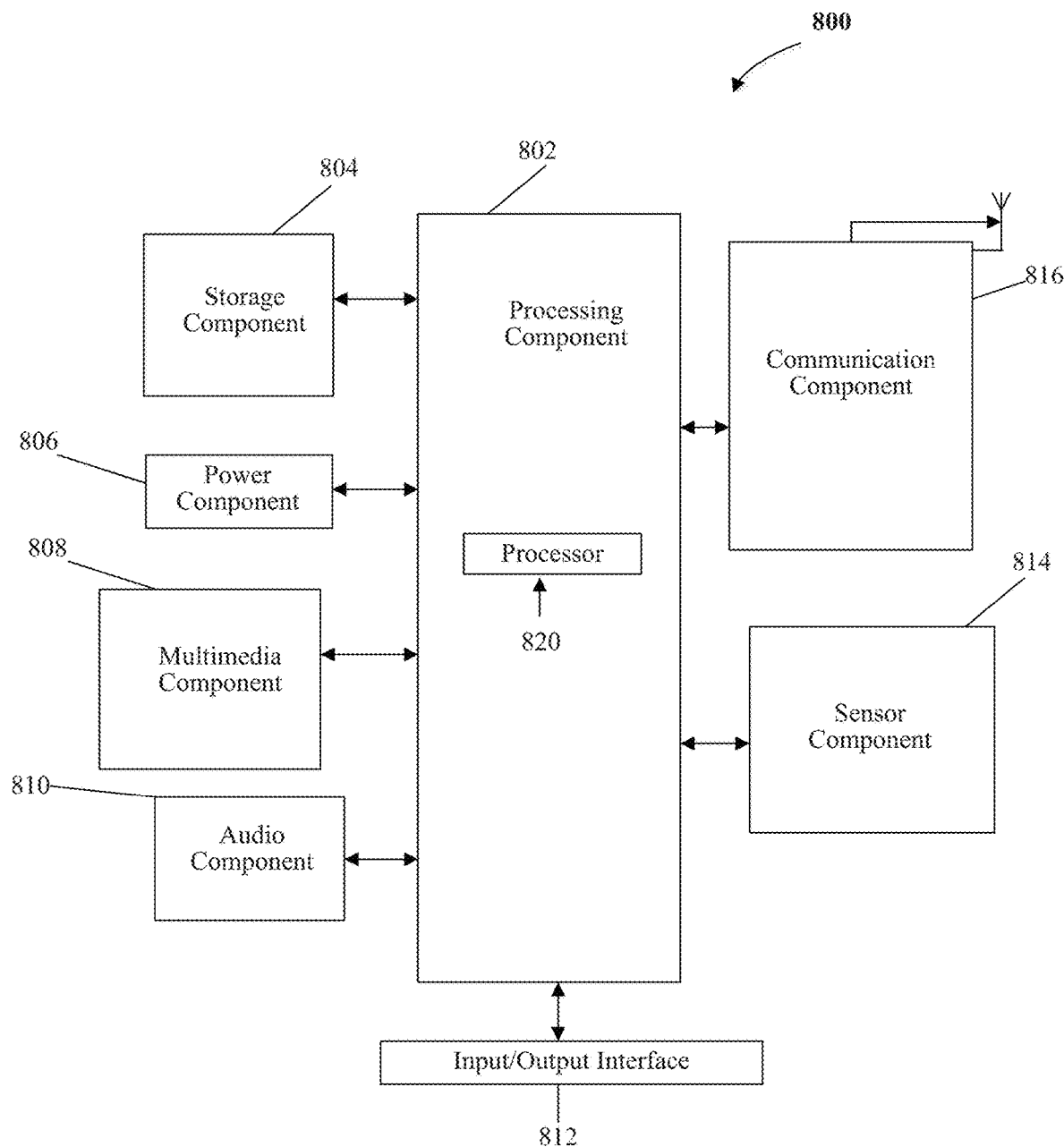
FIG. 8 is a block diagram of a power supply control apparatus for a power strip according to an exemplary embodiment.

FIG. 8 is a block diagram of a power supply control apparatus 800 for a power strip according to an exemplary embodiment. For example, the apparatus 800 may be a part of a power strip, the power strip, or an apparatus separate from the power strip such as a mobile phone, a computer, a digital broadcast terminal, a message transceiver device, a game console, a tablet device, a medical device, fitness equipment, a personal digital assistant or the like.

Referring to FIG. 8, the apparatus 800 may include one or more following components: a processing component 802, a storage component 804, a power component 806, a multimedia component 808, an audio component 810, an input/output (I/O) interface 812, a sensor component 814 and a communication component 816.

The processing component 802 typically controls overall operations of the apparatus 800, such as the operations associated with display, telephone calls, data communications, camera operations and recording operations. The processing component 802 may include one or more processors 820 to execute instructions to perform all or part of the steps in the above described methods. Moreover, the processing component 802 may include one or more modules which facilitate the interaction between the processing component 802 and other components. For example, the processing component 802 may comprise a multimedia module to facilitate the interaction between the multimedia component 808 and the processing component 802.

The storage component 804 is configured to store various types of data to support the operation of the apparatus 800. Examples of such data comprise instructions for any applications or methods operated on the apparatus 800, contact data, phonebook data, messages, pictures, video, etc. The storage component 804 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may comprise a power management system, one or more power sources, and any other components associated with the generation, management, and distribution of power in the apparatus 800.

The multimedia component 808 comprises a screen providing an output interface between the apparatus 800 and the user. In some embodiments, the screen may comprise a liquid crystal display (LCD) and a touch panel. If the screen comprises the touch panel, the screen may be implemented as a touch screen to receive input signals from the user. The touch panel comprises one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the apparatus 800 is in an operation mode, such as a call mode, a recording mode, and a voice recognition mode. The received audio signal may be further stored in the storage component 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 comprises one or more sensors to provide status assessments of various aspects of the apparatus 800. For instance, the sensor component 814 may detect an open/closed status of the apparatus 800, relative positioning of components, e.g., the display and the keypad, of the apparatus 800, a change in position of the apparatus 800 or a component of the apparatus 800, presence or absence of user's contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor or a temperature sensor.

The communication component 816 is configured to facilitate communication, wired or wirelessly, between the apparatus 800 and other devices. The apparatus 800 can access a wireless network based on a communication standard, such as WiFi, 2G, 3G, or 4G, or a combination thereof. In one exemplary embodiment, the communication component 816 receives a broadcast signal from an external broadcast management system via a broadcast channel or broadcast associated information. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an exemplary embodiment, there is also provided a non-transitory computer-readable storage medium including instructions, such as included in the storage component 804, executable by the processor 820 in the apparatus 800, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein instructions that, when executed by a processor of an apparatus, cause the apparatus to perform the power supply control method of a power strip. The method includes: acquiring a charge state or a working state of an electronic device; and controlling a power supply state of a socket of the power strip which is connected with the electronic device according to the charge state or the working state of the electronic device.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of sub-modules.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. The specification and examples are intended to be exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method of power supply control for a power strip, comprising:
   acquiring a charge state or a working state of an electronic device;
   controlling a power supply state of a socket of the power strip according to the charge state or the working state of the electronic device, the socket being connected with the electronic device; and
   when it is detected that the electronic device is plugged in the power strip, performing at least one of:
      determining the socket according to a sensing signal detected by a sensor provided on a metal sheet of the socket, or
      determining the socket and device identification information of the electronic device, establishing a correspondence between the device identification information and the socket, and when the electronic device is in a preset charge state or a preset working state, determining the socket according to the correspondence.

2. The method according to claim 1, wherein controlling the power supply state of the socket comprises:
   when a state of charge (SOC) of the electronic device reaches a first preset value, controlling the socket to enter a power supply disabled state; and
   when the SOC of the electronic device is smaller than a second preset value, controlling the socket to enter a power supply enabled state.

3. The method according to claim 1, wherein controlling the power supply state of the socket comprises:
   when the electronic device has completed a preset task, controlling the socket to enter a power supply disabled state.

4. The method according to claim 1, wherein acquiring the charge state or the working state of the electronic device comprises
   receiving, using a wireless communications technology, state information sent by the electronic device, the state information including the charge state or the working state of the electronic device.

5. The method according to claim 4, wherein the state information comprises the device identification information of the electronic device.

6. The method according to claim 1, wherein determining the device identification information of the electronic device comprises:
   determining a unit time electric current value of power supply to the electronic device;
   determining device identification information corresponding to the unit time electric current value, according to a pre-stored table mapping preset unit time electric current values to preset device identification information; and
   determining the device identification information corresponding to the unit time electric current value as the device identification information of the electronic device.

7. A power supply control apparatus of a power strip, comprising:
   a processor; and
   a memory configured to store instructions executable by the processor,
   wherein the processor is configured to:
      acquire a charge state or a working state of an electronic device;
      control a power supply state of a socket of the power strip according to the charge state or the working state of the electronic device, the socket being connected with the electronic device; and
      when it is detected that the electronic device is plugged in the power strip, the processor is further configured to:
         determine the socket according to a sensing signal detected by a sensor provided on a metal sheet of the socket, or
         determine the socket and device identification information of the electronic device, establish a correspondence between the device identification information and the socket, and when the electronic device is in a preset charge state or a preset working state, determine the socket according to the correspondence.

8. The apparatus according to claim 7, wherein the processor is further configured to:
   when a state of charge (SOC) of the electronic device reaches a first preset value, control the socket to enter a power supply disabled state; and
   when the SOC of the electronic device is smaller than a second preset value, control the socket to enter a power supply enabled state.

9. The apparatus according to claim 7, wherein the processor is further configured to:
   when the electronic device has completed a preset task, control the socket to enter a power supply disabled state.

10. The apparatus according to claim 7, wherein the processor is further configured to perform:
    receiving, using a wireless communications technology, state information sent by the electronic device, the state information comprising the charge state or working state of the electronic device.

11. The apparatus according to claim 10, wherein the state information comprises the device identification information of the electronic device.

12. The apparatus according to claim 7, wherein the processor is further configured to:
    determine a unit time electric current value of power supply to the electronic device;
    determine device identification information corresponding to the unit time electric current value, according to a pre-stored table mapping preset unit time electric current values to preset device identification information; and
    determine the device identification information corresponding to the unit time electric current value as the device identification information of the electronic device.

13. A non-transitory computer-readable storage medium having stored therein instructions that, when executed by a processor of an apparatus, cause the apparatus to perform a power supply control method for a power strip, the method comprising:
    acquiring a charge state or a working state of an electronic device;
    controlling a power supply state of a socket of the power strip according to the charge state or working state of the electronic device, the socket being connected with the electronic device; and
    when it is detected that the electronic device is plugged in the power strip, performing at least one of:

determining the socket according to a sensing signal detected by a sensor provided on a metal sheet of the socket, or determining the socket and device identification information of the electronic device, establishing a correspondence between the device identification information and the socket, and when the electronic device is in a preset charge state or a preset working state, determining the socket according to the correspondence.

14. The storage medium according to claim 13, wherein the method further comprises:

when a state of charge (SOC) of the electronic device reaches a first preset value, controlling the socket to enter a power supply disabled state; and when the SOC of the electronic device is smaller than a second preset value, controlling the socket to enter a power supply enabled state.

15. The storage medium according to claim 13, wherein the method further comprises:

when the electronic device has completed a preset task, controlling the socket to enter a power supply disabled state.

16. The storage medium according to claim 13, wherein the method further comprises:

receiving, using a wireless communications technology, state information sent by the electronic device, the state information comprising the charge state or working state of the electronic device.

* * * * *